(12) United States Patent
Kishimoto et al.

(10) Patent No.: US 6,339,462 B1
(45) Date of Patent: Jan. 15, 2002

(54) LCD HAVING POLYMER WALL AND COLUMN-LIKE PROJECTION DEFINING CELL GAP

(75) Inventors: Katsuhiko Kishimoto, Nara; Kazuyuki Endo, Tajimi; Nobuhiro Kondo, Yamatokoriyama, all of (JP)

(73) Assignees: Sharp Kabushiki Kaisha, Osaka; Sony Corporation, Tokyo, both of (JP)

( * ) Notice: Subject to any disclaimer, the term of this patent is extended or adjusted under 35 U.S.C. 154(b) by 0 days.

(21) Appl. No.: 09/342,504

(22) Filed: Jun. 29, 1999

(30) Foreign Application Priority Data

Jun. 30, 1998 (JP) ............................................. 10-185493
Jun. 1, 1999 (JP) ............................................. 11-154393

(51) Int. Cl.[7] ............................................. G02F 1/1339
(52) U.S. Cl. ............................................. 349/156
(58) Field of Search ............................ 349/156, 155, 349/123, 130, 191, 129

(56) References Cited

FOREIGN PATENT DOCUMENTS

| JP | 7-120728 A | 5/1995 |
| JP | 10-10502 A | 1/1998 |

*Primary Examiner*—Toan Ton
*Assistant Examiner*—Andrew Schechter
(74) *Attorney, Agent, or Firm*—Nixon & Vanderhye P.C.

(57) ABSTRACT

A liquid crystal display device includes a first substrate; a second substrate; and a liquid crystal layer interposed between the first substrate and the second substrate. The first substrate includes a polymer wall extending in a first direction and a second direction intersecting the first direction. The liquid crystal layer includes a plurality of liquid crystal regions separated by the polymer wall, and liquid crystal molecules in the plurality of liquid crystal regions are axially symmetrically aligned with respect to an axis perpendicular to a substrate surface. The first substrate further includes a column-like projection, and the column-like projection and the polymer wall define a gap between the first substrate and the second substrate. The column-like projection is provided in an intersection region where a portion of the polymer wall extending in the first direction and a portion of the polymer wall extending in the second direction intersect each other.

2 Claims, 14 Drawing Sheets

30T

30M

30B 30a
33

US 6,339,462 B1

LCD HAVING POLYMER WALL AND COLUMN-LIKE PROJECTION DEFINING CELL GAP

BACKGROUND OF THE INVENTION

1. Field of the Invention

The present invention relates to a liquid crystal display device and a method for producing the same. In particular, the present invention relates to a liquid crystal display device having liquid crystal molecules which are axially symmetrically aligned in liquid crystal regions separated by a polymer wall, and a method for producing the same.

2. Description of the Related Art

Conventionally, TN (twisted nematic)-type liquid crystal devices or STN (super twisted nematic)-type liquid crystal devices have been used as a display device employing electrooptic effects. Technologies to enlarge a viewing angle have actively been developed.

As one of the technologies for enlarging the viewing angle which have been developed, Japanese Laid-Open Publication Nos. 6-301015 and 7-120728 disclose a liquid crystal display device having liquid crystal molecules which are axially symmetrically aligned in liquid crystal regions separated by a polymer wall. Such a device is commonly referred to as an ASM (axially symmetrically aligned microcell) mode liquid crystal display device. The liquid crystal regions substantially surrounded by the polymer wall are typically formed pixel by pixel. In an ASM mode liquid crystal display device, liquid crystal molecules are axially symmetrically aligned, and thus observers experience less variations in the contrast, irrespective of a viewing direction in which the observers view the display. In other words, such a device has a wide viewing angle characteristic.

An ASM mode liquid crystal display device disclosed in the above-mentioned publications is fabricated by polymerization-induced phase separation of a mixture containing a polymerizable material and a liquid crystal material.

A method for producing a conventional ASM mode liquid crystal display device will be described with reference to FIGS. 10A through 10I. First, a glass base plate 908 (shown in FIG. 10A) is provided with a color filter and electrodes formed on one side (upper surface) thereof. For simplicity, the color filter and the electrodes formed on the upper surface of the glass base plate 908 are not shown. A process of forming the color filter will be described later.

Then, as shown in FIG. 10B, a polymer wall 917 for axially symmetrically aligning liquid crystal molecules is formed, for example, in lattice on the surface of the glass base plate 908, where the electrodes and the color filter are formed. The polymer wall 917 is formed in lattice by spin-coating the glass base plate 908 with a photosensitive resin material, and then performing exposure and development using a photomask having a predetermined pattern. The photosensitive resin material may be either a negative type or a positive type. Alternatively, the polymer wall can be formed by employing a resin material with no photosensitivity, although a separate step of forming a resist layer must be added.

As shown in FIG. 10C, column-like projections 920 are discretely patterned on a portion of an upper surface of the polymer wall 917 thus formed. The column-like projections 920 are formed in a discrete manner by patterning a photosensitive resin material on a portion of an upper surface of the polymer wall 917, and by performing proximity exposure and development.

As shown in FIG. 10D, the surface of the glass base plate 908 is coated with a vertical alignment material 921 such as polyimide or the like so as to cover the polymer wall 917 and the column-like projections 920. Thus, a substrate is formed. Likewise, as shown in FIGS. 10E and 10P, a counter glass base plate 902 is also coated with the vertical alignment material 921 so as to cover an electrode (not shown) formed thereon, thereby forming a counter substrate.

As shown in FIG. 10G, the two resultant substrates are attached together in such a way that the surfaces having electrodes are facing inward. In this manner, a liquid crystal cell is formed. A gap between the two substrates (i.e., a thickness of a liquid crystal layer described later; referred to as a "cell gap" is defined by the sum of the heights of the polymer wall 917 and the column-like projections 920.

As shown in FIG. 10H, a liquid crystal material is injected into a gap in the liquid crystal cell thus obtained by a vacuum injection method or the like, thereby forming a liquid crystal layer 916. The liquid crystal layer 916 is divided into a plurality of liquid crystal regions 915 (only one is shown in FIG. 10I) by the polymer wall 917. As shown in FIG. 10I, liquid crystal molecules in the liquid crystal region 915 are controlled to be axially symmetrically aligned with respect to an axis 918 (shown by the dotted line) which is perpendicular to both the glass base plates 908 and 902. The liquid crystal molecules are thus controlled by, for example, applying a voltage between a pair of electrodes respectively provided on the glass base plates 908 and 902 and facing each other.

A cross section of a color filter is shown in FIG. 11. A black matrix (BM) 510 and a color resin layer 512 including a red color (R) pattern, a green color (G) pattern, and a blue color (B) pattern are formed on a glass base plate 508. The red, green, and blue color patterns each correspond to a pixel. The black matrix 510 blocks light passing through a gap between the color patterns. An overcoat (OC) layer 514 formed of an acrylic resin, an epoxy resin or the like is provided on the black matrix 510 and the color resin layer 512 to a thickness of about 0.5 $\mu$m to about 2.0 $\mu$m so as to improve the smoothness and the like of the surface of the color filter. On top of the overcoat layer 514, a transparent signal electrode 516 formed of an indium tin oxide (ITO) layer is further provided. The black matrix 510 is generally made of a metal chromium layer having a thickness of about 100 nm to about 150 nm. As the color resin layer 512, a resin material colored by a dye or pigment is used. Generally, the thickness of the color resin layer 512 is about 1 $\mu$m to about 3 $\mu$m.

The color resin layer 512 is formed by patterning a photosensitive color resin layer formed on the glass base plate 508 by photolithography. For example, by forming, exposing and developing red, green, and blue photosensitive color resin layers (i.e., each step is repeated three times in total), the color resin layer 512 including red, green, and blue patterns can be fabricated. The photosensitive color resin layers can be formed by applying a liquid photosensitive color resin material (diluted with a solvent) on a base plate by a spin-coating method or the like, or by transferring a photosensitive color resin material in the form of a dry film onto a plate. By fabricating the above-described ASM mode liquid crystal display device with such a color filter, a color liquid display device having a wide viewing angle characteristic can be obtained.

However, when the above-described ASM mode liquid crystal display device and the method for producing such a device are applied to a large liquid crystal display device having high resolution display characteristics, the following problems described with reference to FIGS. 12A through 12D will arise.

As shown enlarged in FIGS. 12A through 12D, the polymer wall 917 and the column-like projections 920 are formed in such a way that their side surfaces are inclined (i.e., tapered) with respect to the base plate 908. Such an inclination is inevitable in proximity exposure usually employed in photolithography performed for a large base plate, by which a photomask and a base plate are exposed in the state of being proximate to each other. The reason is that a proximity gap (i.e., a gap between large base plate and a correspondingly large photomask) cannot be extremely reduced. In the case where the proximity gap is extremely reduced, the base plate and the mask are occasionally in contact with each other due to a warp or a flexion of the base plate and the mask. In order to prevent any damage caused by such a contact between the mask and the base plate, the proximity gap must have a certain size (about 100 $\mu$m). Accordingly, a relatively wide spread of light passing through the mask, or the like, results in a formation of the polymer wall 917 and the column-like projections 920 in such a tapering manner. The relatively wide spread of the light also causes the polymer wall 917 and the column-like projections 920 to be larger than the pattern of the photomask. As can be understood from such a phenomenon, it is difficult to form the polymer wall 917 and the column-like projections 920 in a microscopic pattern.

In the structure shown in FIGS. 12A and 12B, since the height h of the polymer wall 917 is relatively high and the width thereof is wide with respect to the cell gap d, the column-like projections 920 can easily be provided on the polymer wall 917. However, when the height h of the polymer wall 917 is constructed as high as shown, the polymer wall 917 may act as a resistance against an injection of the liquid crystal material into the gap of the liquid crystal cell. Such a phenomenon increases time required for injecting the liquid crystal material and thus lowers the throughput. Especially when subjecting a thick layer to photolithography, the resultant size of the polymer wall 917 and the column-like projections 920 occasionally become larger than the pattern size of the photomask by up to a several ten percent. Accordingly, the width of the polymer wall 917 is increased, so as to reduce an opening width of the liquid crystal region 915 by that amount of increase, thereby reducing a numerical aperture of the liquid crystal display device. These problems are particularly conspicuous when the pattern of the polymer wall and the like are formed to be microscopic in order to produce a high resolution liquid crystal display device.

Therefore, as shown in FIGS. 12C and 12D, there is a case where a polymer wall 917' having a smaller height h' and a smaller width is preferred. In such a structure, as compared to the structure shown in FIGS. 12A and 12B, the numerical aperture of the display device can be increased, thereby improving a brightness of the display and reducing the time required for the injection of the liquid crystal material. Yet, as can be seen in FIGS. 12C and 12D, the relative height of column-like projections 920' is increased, while the width of the polymer wall 917' is decreased. As a result of the narrowed width of the polymer wall 917', a bottom portion of the column-like projections is formed to be extended beyond the width of the polymer wall 917'. In particular, since the resin layer forming the column-like projections 920' is thick, there is a possibility that the bottom portion of the column-like projections 920' is formed of greater width than the mask pattern by a several ten percent. A part of the column-like projections 920' is formed also within a liquid crystal region 915', which reduces the numerical aperture of the display device. Furthermore, when a part of the column-like projections 920' is formed within the liquid crystal region 915', the axially symmetrical alignment of the liquid crystal molecules is disturbed, and as a result, a leakage of light, for example, is generated in a black display state, thereby inducing a flickering in images being displayed.

SUMMARY OF THE INVENTION

According to one aspect of the invention, a liquid crystal display device includes a first substrate; a second substrate; and a liquid crystal layer interposed between the first substrate and the second substrate. The first substrate includes a polymer wall extending in a first direction and in a second direction intersecting the first direction. The liquid crystal layer includes a plurality of liquid crystal regions separated by the polymer wall, and liquid crystal molecules in the plurality of liquid crystal regions are axially symmetrically aligned with respect to an axis perpendicular to a substrate surface. The first substrate further includes a column-like projection, and the column-like projection and the polymer wall define a gap between the first substrate and the second substrate. The column-like projection is provided in an intersection region where a portion of the polymer wall extending in the first direction and a portion of the polymer wall extending in the second direction intersect each other.

In one embodiment of the invention, at least one part of the column-like projection extends into a portion of the polymer wall beyond the intersection region.

In another embodiment, the column-like projection has a quadrangular area facing the substrate surface, and the at least one part of the column-like projection includes at least one corner among four corners of the quadrangular area.

In still another embodiment, four sides of the quadrangular area are at a 45 degree angle with respect to the first direction.

In yet another embodiment, the column-like projection is provided on the polymer wall and has a side surface inclined with respect to the substrate surface, and the polymer wall has a height lower than that of the column-like projection.

According to another aspect of the invention, a method for producing a liquid crystal display device including a first substrate having a base plate, a second substrate, and a liquid crystal layer interposed between the first substrate and the second substrate, the liquid crystal layer having a plurality of liquid crystal regions separated by a polymer wall is provided. The method includes the steps of forming a polymer layer on the base plate; patterning the polymer layer, thereby forming the polymer wall extending in a first direction and in a second direction, the second direction intersecting the first direction; forming a resin layer on the base plate to cover the polymer wall; and patterning the resin layer, thereby forming a column-like projection in an intersection region where a portion of the polymer wall extending in the first direction and a portion of the polymer wall extending in the second direction intersect each other.

In one embodiment of the invention, the resin layer is formed of a photosensitive resin, and the step of forming the column-like projection includes the step of patterning the resin layer by photolithography.

In another embodiment of the invention, the step of patterning the resin layer Includes the step of exposing the resin layer through a mask having a quadrangular opening, wherein the resin layer is exposed to light generated by a first, second, third and fourth light sources arranged in such a way that images thereof are located on diagonal lines and in the vicinity of corners of the quadrangular opening, thereby forming the column-like projection having a bottom surface corresponding to the quadrangular opening.

In yet another embodiment, the resin layer is formed of a transparent resin.

According to the present invention, the column-like projections are provided on the intersection of the polymer wall, so that the column-like projections can be formed to have a wider bottom surface than the width of the lattice pattern of the polymer wall without causing an adverse effect on the liquid crystal molecules in the liquid crystal display regions. Thus, even in the case where the size of the pattern of the polymer wall is reduced by refinement of the liquid crystal display device, the column-like projections can be placed on the polymer wall. Furthermore, column-like projections of a large liquid crystal display device are generally formed by utilizing a proximity exposure, and thus, side surfaces of the column-like projections are inclined with respect to the substrate surface. According to the present invention, even in the case where the large liquid crystal display device is structured in such a way that the polymer wall is low and the column-like projections are relatively high, the column-like projections can be formed in positions which give no adverse effect on the liquid crystal display regions.

According to the present invention, the column-like projection is provided in such a way that a bottom surface thereof is at a 45 degree angle with respect to the lattice pattern of the polymer wall. As a result, even in the case where the column-like projection is formed to be of offset from the polymer wall, into the liquid crystal regions, none of the corners of the column-like projection is in the liquid crystal regions. Thus, a disturbance in the axially symmetrical alignment of the liquid crystal molecules is prevented. Accordingly, even in the case where the polymer wall and the column-like projections are offset from each other, the axially symmetrical alignment of the liquid crystal molecules is not disturbed, as long as such an offset is kept within half of the width of the polymer wall. This enables an increase in an alignment margin for a production process.

Moreover, when the column-like projections are produced to be greater than are originally designed, the axially symmetrical alignment of the liquid crystal molecules is not disturbed for the same reason described above, and thus, a process margin of the production can be increased.

A patterning to form the column-like projections is implemented by exposing a resin layer via a mask having a quadrangular opening. During the exposure process, it is preferable to arrange images of first, second, thirds and fourth light sources in such a way that those images are placed along diagonal lines and in the vicinity of the apices of the quadrangular opening of the mask. The resin layer is exposed to light generated by the first, second, third, and fourth light sources thus arranged to form the column-like projections having a bottom surface corresponding to the quadrangular opening. As a result, the column-like projections with a bottom surface extending to in the directions of the diagonal lines of the quadrangular opening can be constructed. Therefore, the column-like projections do not extend beyond the intersection regions of the polymer wall, so as to prevent the column-like projections from adversely affecting the axially symmetrical alignment of the liquid crystal molecules.

When a transparent photosensitive resin is used to form the column-like projections, an alignment mark can be recognized even when the entire substrate is coated with the transparent resin. Thus, an accurate position alignment can be achieved without complicating the production process.

Thus, the invention described herein makes possible the advantages of providing a liquid crystal display device with a characteristic having a wide viewing angle and providing high precision and bright images, and a method for producing such a liquid crystal display device.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples.

Figure 1:
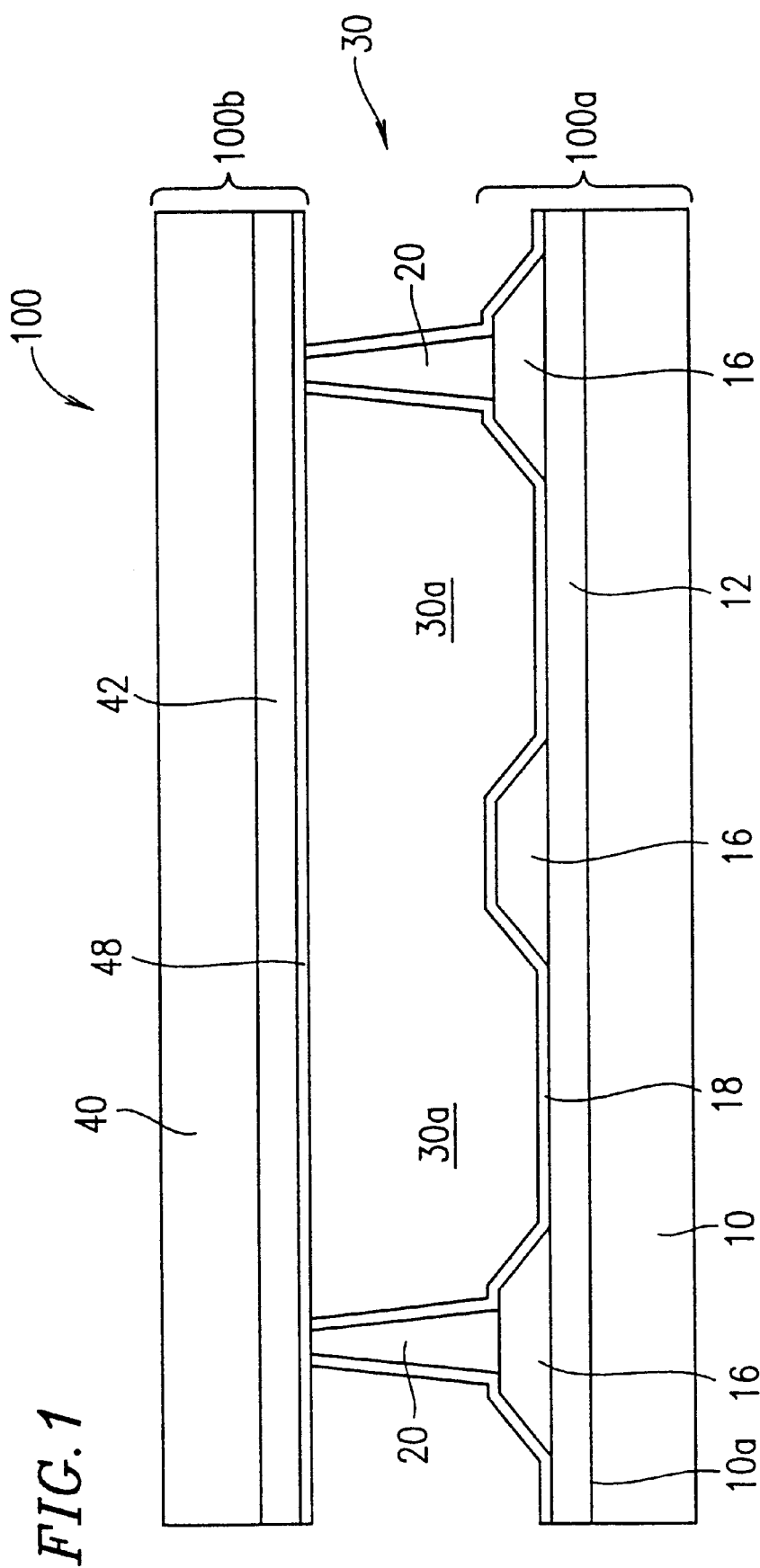
FIG. 1 is a cross-sectional view illustrating a structure of a liquid crystal display device according to the present invention.

FIG. 1 shows a schematic cross section of a liquid crystal display device 100 in an example according to the present invention. Although in the present example, a liquid crystal material having a negative dielectric anisotropy and a vertical alignment layer are used, the present invention is not limited to such a structure.

The liquid crystal display device 100 has a first substrate 100a and a second substrate 100b, with a liquid crystal layer 30 interposed therebetween. The liquid crystal layer 30 includes liquid crystal molecules having a negative dielectric anisotropy (not shown). The first substrate 100a is structured as follows. A first transparent base plate 10 formed of, for example, glass, is provided with a first transparent electrode 12 formed on a surface thereof. In this specification, a top surface 10a of the transparent base plate 10 or an equivalent thereof is referred to as a "substrate surface". The first transparent electrode 12 is made of ITO (indium tin oxide) or the like. On the first transparent electrode 12, a polymer wall 16 made of a resin material is formed, for example, in lattice. The polymer wall 16 separates the liquid crystal layer 30 into a plurality of liquid crystal regions 30a, while proving an effect to axially symmetrically align liquid crystal molecules (not shown) within each liquid crystal region 30a. In other words, the liquid crystal region 30a is defined by the polymer wall 16, and the polymer wall 16 substantially surrounds the liquid crystal regions 30a. In the present example, the polymer wall 16 is provided in lattice so that the liquid crystal regions 30a each correspond to a pixel region, but it is not limited to such an arrangement.

On an upper surface of the polymer wall 16, column-like projections 20 are formed at intersections (not shown) of the polymer wall 16 so as to define a thickness (cell gap) of the liquid crystal layer 30. In the present example, the surface of the column-like projections 20, contacting the polymer wall 16, is generally square. An appropriate number of the column-like projections 20 are formed to achieve an appropriate density so that a sufficient strength of the liquid crystal display device can be obtained. The polymer wall 16 is formed to be lower than the column-like projections 20. A vertical alignment layer 18 is provided on the transparent electrode 12 so as to cover the polymer wall 16 and the column-like projections 20 in order to align the liquid crystal molecules in the liquid crystal layer 30.

The second substrate 100b is structured as follows. A second transparent base plate 40 formed of, for example, glass, is provided with a second transparent electrode 42 formed on a surface thereof facing the liquid crystal layer 30. The second transparent electrode 42 is formed of ITO or the like. A vertical alignment film 48 is formed to cover the second transparent electrode 42.

The first electrode 12 and the second electrode 42 for driving the liquid crystal molecules in the liquid crystal layer 30 can have a known structure and can be driven by a known method used for electrodes. For example, the structure and driving method can be of an active matrix type or a simple matrix type, or a plasma addressed type. In the case of a plasma addressed type, a plasma discharge channel is provided in place of either one of the first electrode 12 and the second electrode 42. Depending on the electrode structure and driving method being applied, the first substrate 100a and the second substrate 100b may be interchanged with each other. In other words, the second substrate 100b can include the transparent polymer wall 16 and the column-like projections 20. A plasma addressed type liquid crystal display device is disclosed, for example, in Japanese Laid-Open Publication No. 4-128265.

Figure 2A:
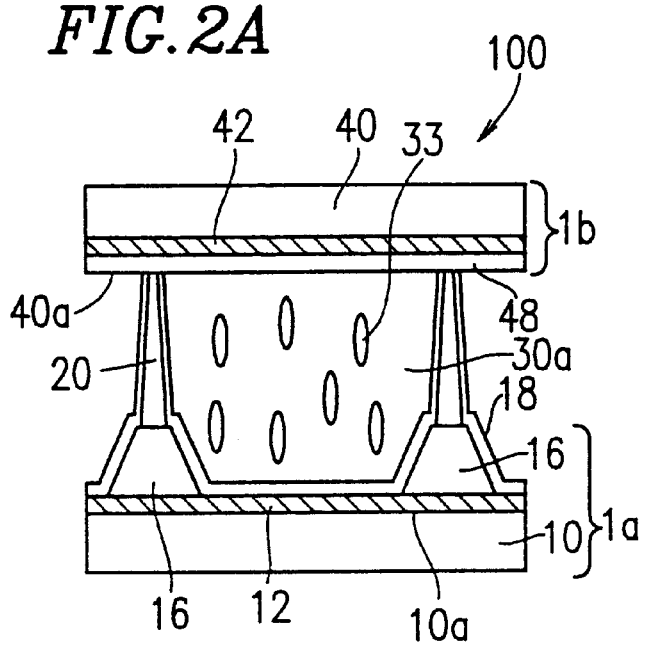
FIGS. 2A and 2B are schematic views illustrating an operation of an ASM mode liquid crystal display device when no voltage is applied to the device.
Figure 2C:
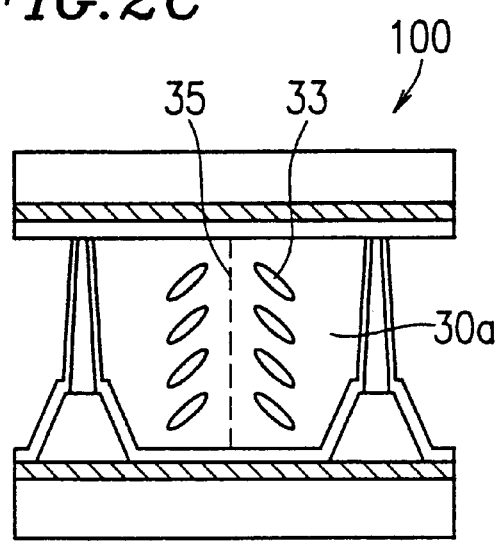
FIGS. 2C and 2D are schematic views illustrating an operation of an ASM mode liquid crystal display device when a voltage is applied to the device.
Figure 2B:
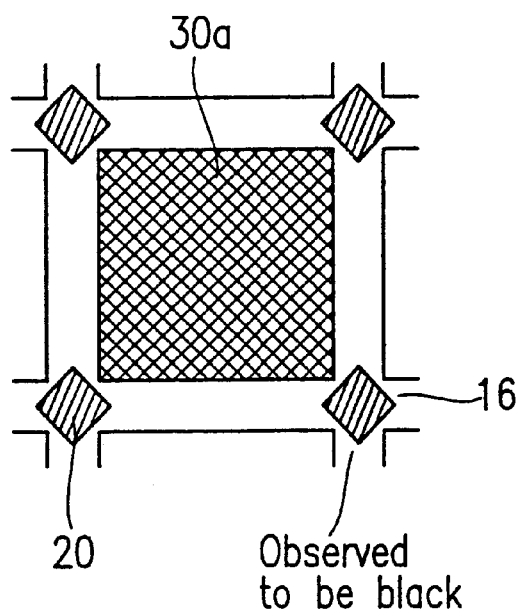
Figure 2D:
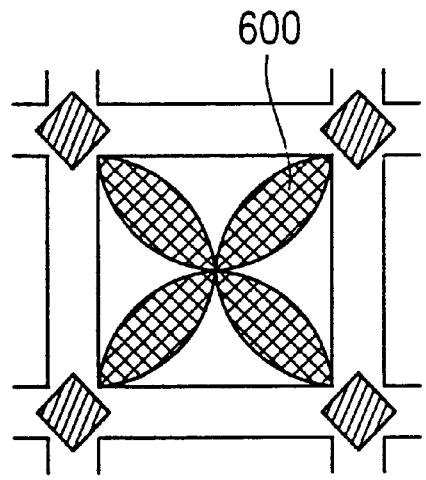

An operation of the liquid crystal display device 100 according to the present example is described with reference to FIGS. 2A through 2D. As shown in FIG. 2A, when a voltage is not applied to the liquid crystal region 30a, liquid crystal molecules 33 are aligned perpendicular to the substrate surface by an alignment force generated by the vertical alignment layers 18 and 48 provided respectively on the substrates 100a and 100b. As described above, the vertical alignment layers 18 and 48 are provided on the surfaces of the substrates 100a and 100b facing the liquid crystal layer 30. When such a state is observed under a polarizing microscope in a crossed nicols state, a dark viewfield (normally black state) is obtained as shown in FIG. 2B. When a voltage for gray scale display is applied to the liquid crystal region 30a, a force acts upon the liquid crystal molecules 33 having a negative dielectric anisotropy so as to align a longitudinal axis of the liquid crystal molecules 33 vertically with respect to a direction of the electric field. As a result, the liquid crystal molecules 33 are tilted from the vertical alignment with respect to the substrate surface (gray scale display state). In this case, the polymer wall 16 affects the liquid crystal molecules 33 within the liquid crystal region 30a to be axially symmetrically aligned with respect to a central axis 35 represented by the dotted line in FIG. 2C. When such a state is observed under a polarizing microscope in a crossed nicols state, an extinction pattern 600 in a direction along a polarization axis is observed as shown in FIG. 2D.

Figure 3B:
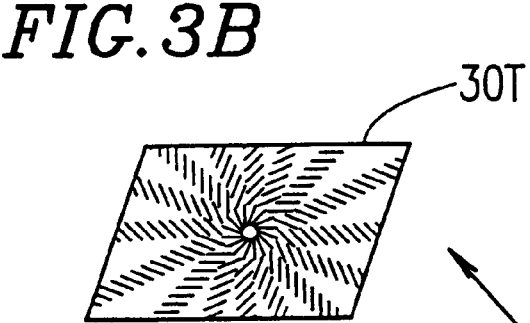
FIGS. 3A and 3B are schematic views illustrating an axially symmetrical alignment of liquid crystal molecules within a liquid crystal region.
Figure 3B:
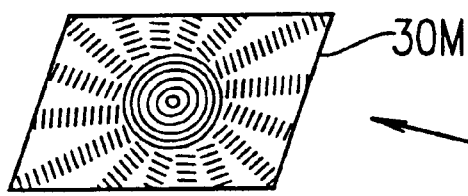
Figure 3B:
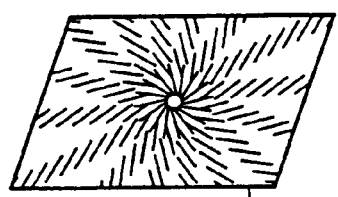
Figure 3A:
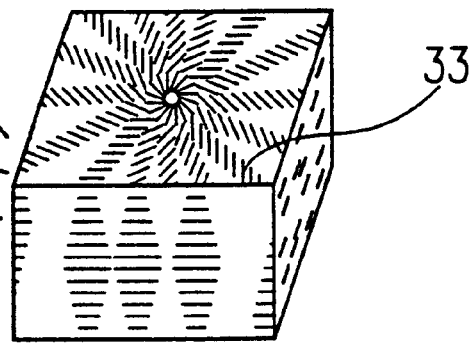

The expression "axially symmetrical alignment" used herein includes concentric (tangential) and radial alignments. A spiral alignment as depicted in FIGS. 3A and 3B is also included. The spiral alignment is obtainable by applying a twist alignment force to the liquid crystal material, through an addition of a chiral dopant. As can be seen in FIG. 3B, the liquid crystal molecules 33 are aligned in a spiral in an upper portion 30T and a lower portion 30B of the liquid crystal region 30a, and are aligned tangentially in a central portion 30M. The liquid crystal molecules 33 are twisted with respect to a direction of the thickness of the liquid crystal region 30a. Generally, the central axis of the axially symmetrical alignment substantially corresponds to a direction normal to the substrate.

By axially symmetrically aligning the liquid crystal molecules, the viewing angle characteristic can be improved. When the liquid crystal molecules are axially symmetrically aligned, the refractive index anisotropy of the liquid crystal molecules is averaged in all azimuth directions. Such an arrangement prevents a problem in that the viewing angle characteristic varies significantly depending on the viewing direction, which is encountered in a gray scale display state of a conventional TN mode liquid crystal display device. Alternatively, a horizontal alignment layer and a liquid crystal material having a positive dielectric anisotropy can be employed so as to obtain an axially symmetrical alignment, even when no voltage is applied. As long as the liquid crystal molecules are axially symmetrically aligned at least when a voltage is applied, a wide viewing angle characteristic can be obtained.

Figure 4A:
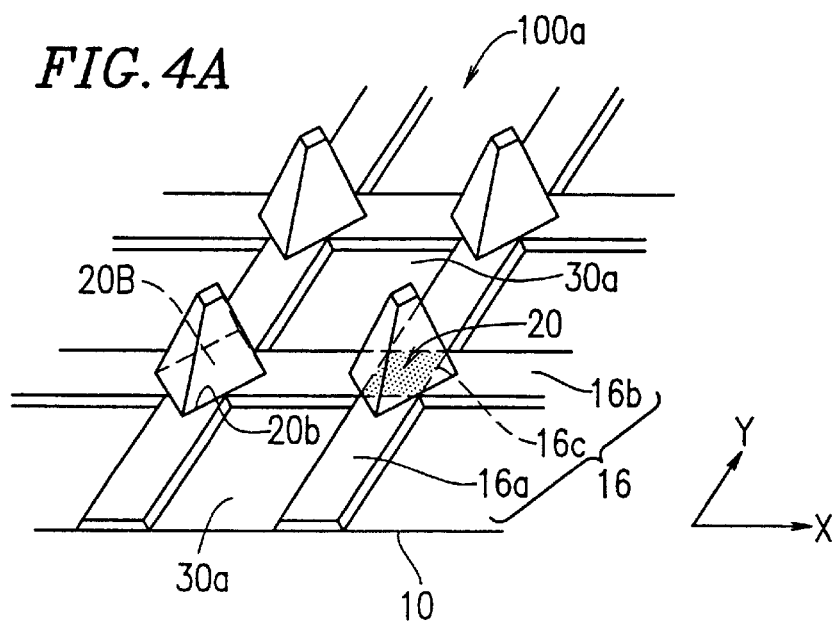
FIG. 4A is a schematic perspective view of a first substrate of the liquid crystal display device shown in FIG. 1.
Figure 4B:
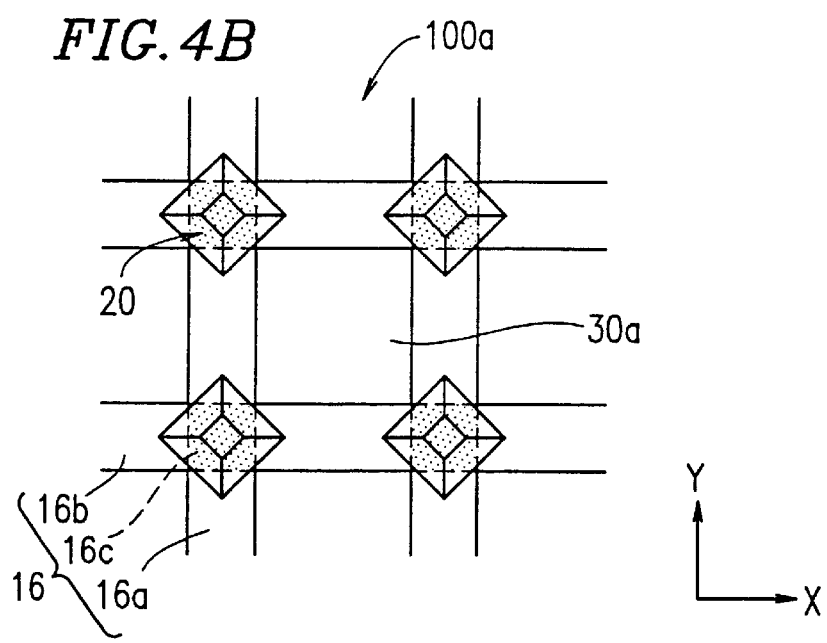
FIG. 4B is a schematic plan view of the first substrate shown in FIG. 4A.

A perspective view and a plan view of the first substrate 100a shown in FIG. 1 are respectively shown in FIGS. 4A and 4B.

Figure 4C:
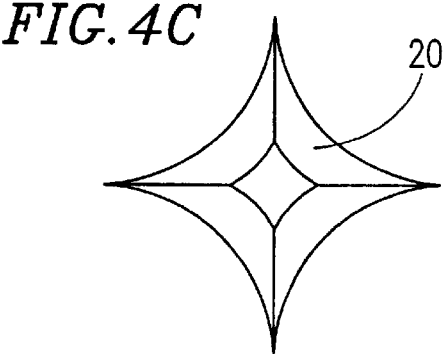
FIG. 4C shows a shape of a column-like projection viewed in a direction normal to the first substrate.

The polymer wall 16 is provided in lattice with respect to the transparent base plate 10 so as to define the plurality of the liquid crystal regions 30a. The polymer wall 16 includes portions 16a which extend in a direction of the y axis and portions 16b which extend in a direction of the x axis. On intersection regions 16c where the portions 16a and 16b intersect each other, the column-like projections 20 are provided. The column-like projections 20 of the present example have a truncated quadrangular pyramid shape. Bottom surfaces 20B of the column-like projections 20, that is, the surfaces contacting the polymer wall 16, are substantially square, and four side surfaces are trapezoidal. Four sides 20b of the bottom surfaces 20B are provided at a 45 degree angle inclination with respect to the x axis and the y axis respectively. In other words, diagonal lines of the bottom surfaces 20B are provided respectively parallel to the portions 16a of the polymer wall 16 along the y axis and the portions 16b of the polymer wall 16 along the x axis. As described above, the column-like projections 20 are provided on the intersection regions 16c of the polymer wall 16, and the bottom 1sides 20b thereof are provided at an angle with respect to the directions of the x axis and the y axis. Accordingly, it is possible to provide the column-like projections on the polymer wall 16 to have bottom sides 20b wider than the line width of the portion 16a (i.e., the size of the portion 16a in the direction of the x axis) or the line width of the portion 16b (i.e., the size of the portions 16b in the direction of the y axis). When a mask having a quadrangular opening is used to form the column-like projections 20 having quadrangular bottom surfaces shown in FIG. 4B, the resultant bottom surfaces are elongated along directions of diagonal lines as shown in FIG. 4C due to interference of light and the like which occurred during the exposure process. Therefore, in order to form the column-like projections 20 having quadrangular bottom surfaces, it is preferable to approximately match the diagonal lines of the quadrangular bottom surfaces with the directions of the x and the y axes in which the polymer wall extends.

Figure 13:
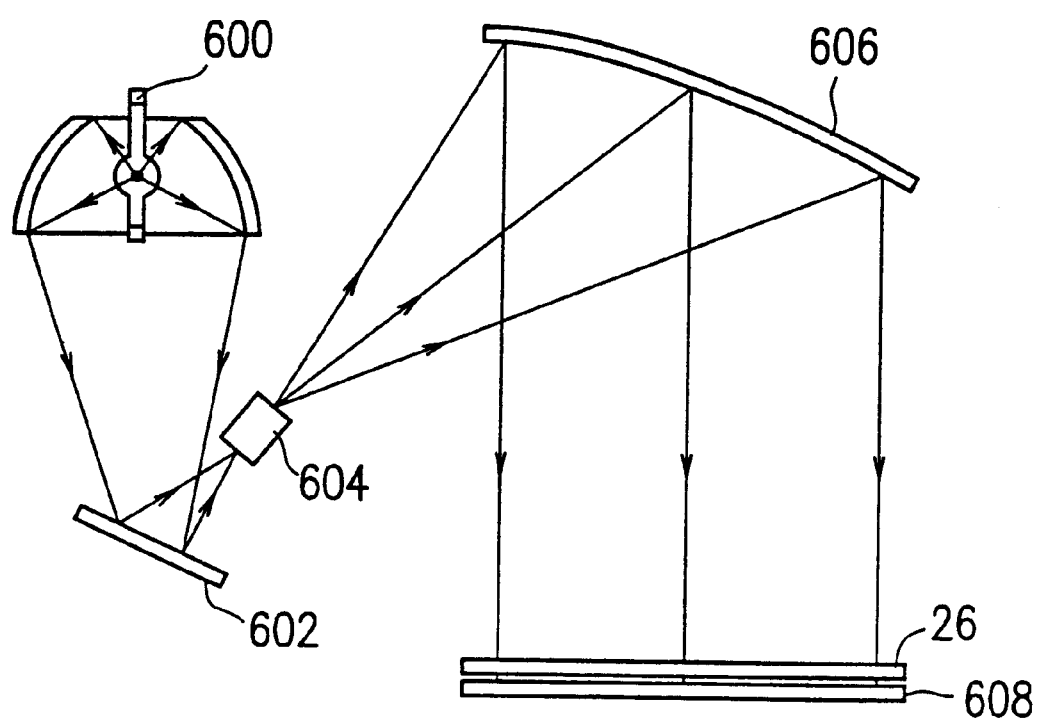
FIG. 13 is a schematic view of a device usable for a typical proximity exposure.

As described above, in a production of a large liquid crystal display device, a proximity exposure in which exposure is implemented with a photomask and a base plate being close to each other, for example, is used. FIG. 13 depicts a device for conducting a typical proximity exposure. Such a device operates as follows. Light generated by a light source 600 is directed to a mask 26 and a base plate 608 via, for example, a dichroic mirror 602, a fly's eye lens 604, and a convex mirror (or parabolic mirror) collimator 606. The light from the light source 600 is reflected on the convex mirror collimator 606 to be collimated, so that the mask 26 and a surface of the base plate 608 are irradiated uniformly. The photomask 26 and the base plate 608 are positioned in the vicinity of each other without making a direct contact. Especially when a large base plate is exposed, two or more light sources 600 are preferably used. Typically, four light sources 600 are preferably used.

In the case where four light sources are employed, the light sources and the mask can be arranged in the following manner in order to form a column-like projection having a quadrangular bottom surface which is elongated along desired diagonal line directions.

Figure 14A:
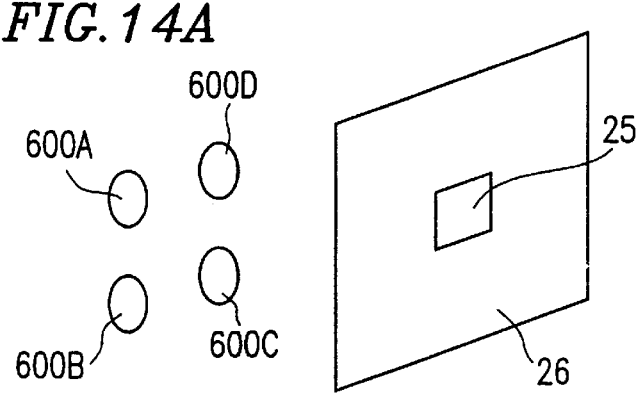
FIG. 14A is a schematic view illustrating an arrangement of light sources and a mask according to the present invention.
Figure 14B:
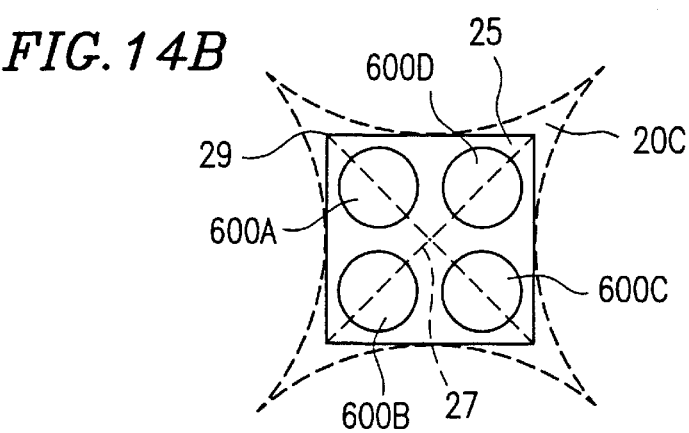
FIG. 14B is a schematic view of a bottom surface of the column-like projection obtained by the arrangement shown in FIG. 14A.

FIG. 14A is a schematic diagram of an arrangement of light sources 600A, 600B, 600C and 600D, and a mask 26 having an opening 25 usable in a formation of the column-like projection 20, according to an example of the present invention. FIG. 14B schematically shows a bottom surface 20C of the resultant column-like projection 20 along with a shape of the opening 25 of the mask and images of the four light sources 600A, 600B, 600C, and 600D. In the present example, an ultra high pressure mercury-vapor lamp, for example, is utilized as a light source. As for the mask 26, a rectangular mask having a size of about 43 inches×32 inches is utilized.

As shown in FIGS. 14A and 14B, in a proximity exposure, the first, second, third, and fourth light sources 600A, 600B, 600C, and 600D are arranged within the quadrangular opening 25 of the mask in such a way that images thereof are in the vicinity of corresponding apices 29 on diagonal lines 27 of the opening 25. Such an arrangement of the light sources realizes a formation of the column-like projection 20 having the bottom surface 20C elongated along the directions of the diagonal lines 27.

Figure 14C:
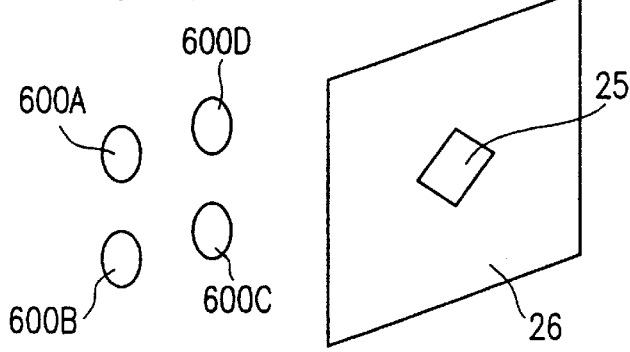
FIG. 14C is a schematic view illustrating a different arrangement of the light sources and the mask.
Figure 14D:
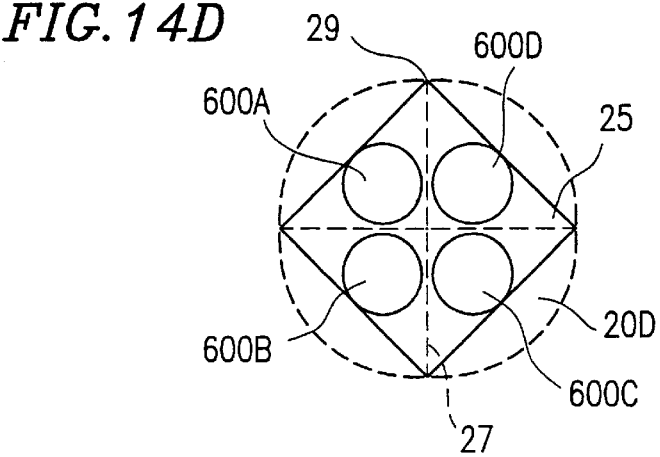
FIG. 14D is a schematic view of a bottom surface of the column-like projection obtained by the arrangement shown in FIG. 14C.

For a comparison, FIG. 14C depicts a different arrangement of the light sources 600A through 600D and the mask 26 having the opening 25. By such an arrangement, images of the light sources 600A through 600D are offset by 45 degrees from the diagonal lines 27 of the opening 25 as shown in FIG. 14D. In such a case, the resultant column-like projection has a bottom surface 20D in which four corners of the quadrangular opening 25 are rounded. Such a phenomenon becomes conspicuous especially when the column-like projection is microscopic (for example, when the column-like projection has a bottom surface having a size of about 20 μm×20 μm or less). The column-like projection with the bottom surface 20D having rounded corners, as shown in FIG. 14D, will have an adverse influence on the axially symmetrical alignment of the liquid crystal molecules since such a column-like projection is formed on the polymer wall, but extend into the liquid crystal region.

Although it is preferable to use the above-described proximity exposure for patterning the column-like projections, the present invention is not limited to such a method.

Referring to the FIGS. 5A through 8B, the present invention will be described in comparison with conventional examples.

Figure 5A:
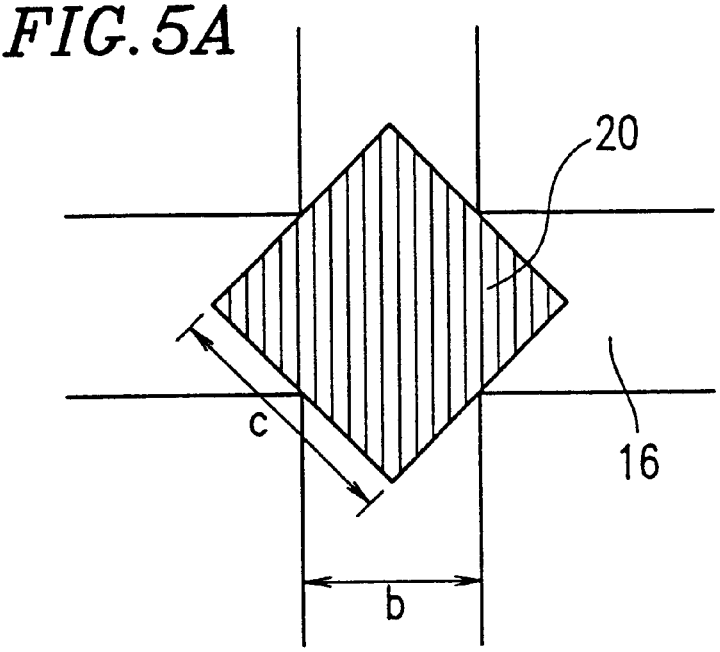
FIG. 5A is a schematic view of a column-like projection on an intersection region of a polymer wall in an example according to the present invention.
Figure 5B:
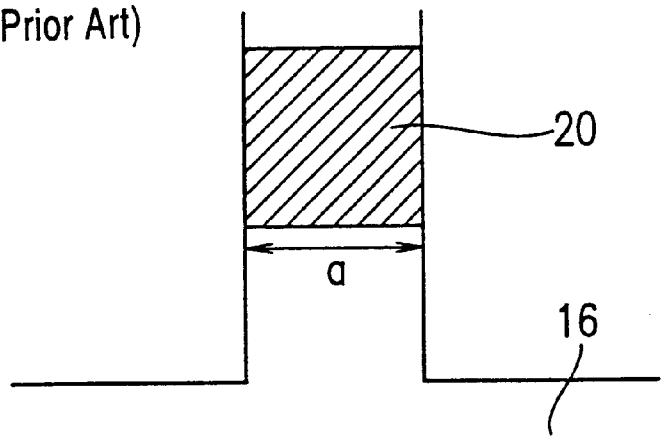
FIG. 5B is a schematic view of a column-like projection which is not formed on an intersection region of the polymer wall in a conventional example.
Figure 5B:
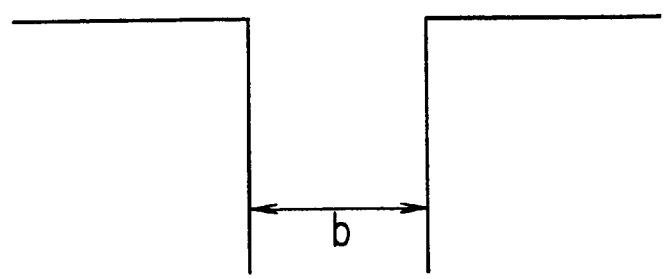

With reference to FIGS. 5A and 5B, an advantage obtained by forming the column-like projections 20 on the intersection regions of the polymer wall 16 will be described. FIG. 5A shows a column-like projection 20 formed at an intersection region of the polymer wall 16 in the example according to the present invention. FIG. 5B shows a conventional example, in which the column-like projection 20 is not formed on an intersection region of the polymer wall 16.

In the case where the column-like projection 20 with a quadrangular bottom surface is formed on the intersection region of the polymer wall 16, as shown in FIG. 5A, a length a of each side of the quadrangular bottom surface of the column-like projections 20 can be as long as √2 times the length of a line width b of the polymer wall 16. In other words, at least one part of the column-like projection 20 is located on a portion of the polymer wall 16 beyond the intersection region of the polymer wall 16. Therefore, the line width b of the polymer wall 16 can be reduced, and still the liquid crystal display device has a sufficient strength.

Moreover, the number of the column-like projections 20 to be constructed can be reduced. By contrast, in the case where the column-like projections 20 are formed in an area other than the intersection regions of the polymer wall 16 as shown in FIG. 5B, a length a of one side of the quadrangular bottom surface is restrained to be less than or equal to the line width b of the polymer wall.

Accordingly, the present invention enables a formation of column-like projections having a relatively large bottom surface. This realizes advantages of an increased alignment margin, decreased number of the column-like projections to be formed per a unit area, applicability of such a structure including a polymer wall and column-like projections to a high precision liquid crystal display panel, and the like.

The column-like projections can have a greater height and thus the polymer wall can have a smaller height without providing adverse effects on the axially symmetrical alignment of the liquid crystal molecules.

Due to the decreased number of the column-like projections and the reduced height of the polymer wall, the injection speed of the liquid crystal material is increased, and the time required for injecting the liquid crystal material is shortened.

Furthermore, an improvement of the brightness of the display can be achieved by an increase in the numerical aperture.

Figure 6A:
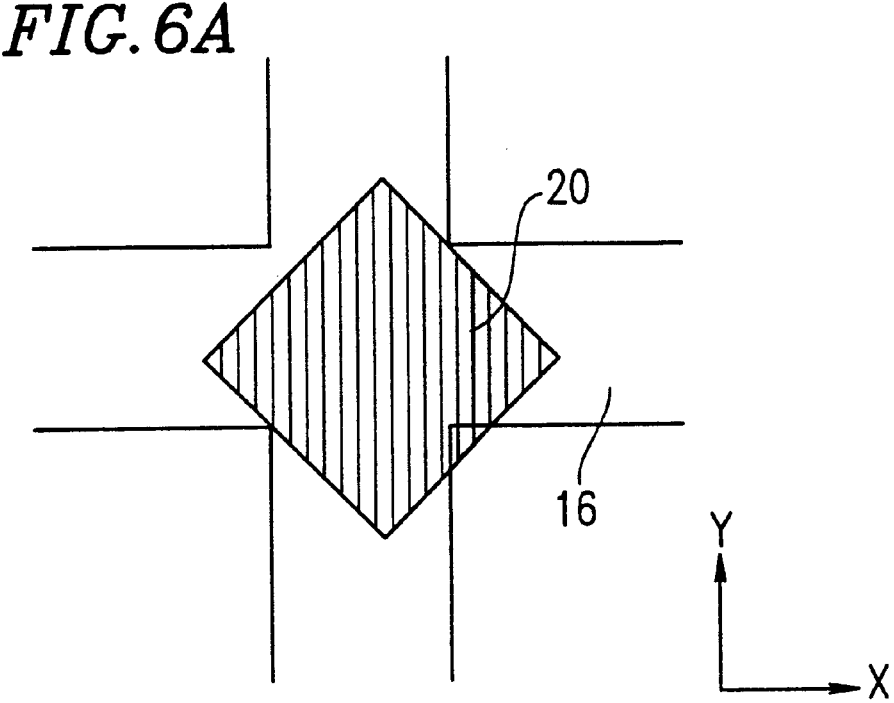
FIGS. 6A and 6B are schematic views of column-like projections formed at offset positions in the example according to the present invention and in the conventional example by comparison.
Figure 6B:
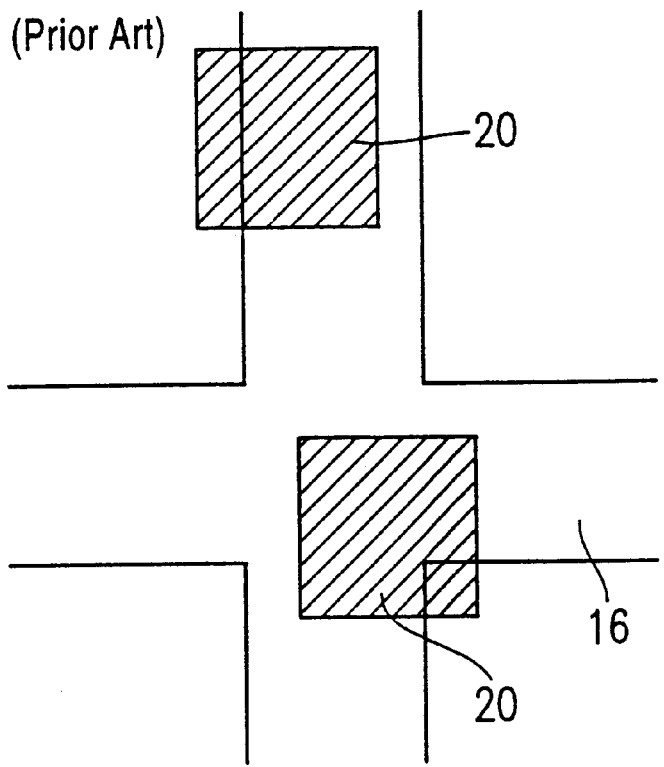

With reference to FIGS. 6A and 6B, the column-like projections 20 formed at offset positions in the example according to the present invention (FIG. 6A) and in the conventional example (FIG. 6B) will be compared.

In FIG. 6A, the column-like projection 20 are formed at an offset position from the position shown in FIG. 5A due to misalignment. However, the diagonal lines of the quadrangular bottom surface of the column-like projection 20 are aligned approximately with the directions in which the polymer wall 16 extends (i.e., directions of x axis and y axis). In other words, the four sides of the quadrangular bottom surface are arranged to be at a 45 degree angle with respect to the directions of the polymer wall 16. Accordingly, the axially symmetrical alignment of the liquid crystal molecules is hardly disturbed. This is because a portion of the column-like projection invading the liquid crystal region has a surface approximately parallel to a tangential direction of a circle centered around the central axis of the axially symmetrical alignment. On the contrary, in the conventional example shown in FIG. 6B, a portion of the column-like projection invading the liquid crystal regions has a corner, and thus the axially symmetrical alignment of the liquid crystal molecules is greatly disturbed so as to result in a deterioration of the viewing angle characteristic and a rough display.

As described above, in the example according to the present invention, the position of the column-like projection can be offset without disturbing the axially symmetrical alignment of the liquid crystal molecules, as long as the amount of the offset remains smaller than or equal to a half of the line width of the polymer wall 16 since the corners of the column-like projection do not invade the liquid crystal regions. In addition, an alignment margin for production can be increased.

Figure 7A:
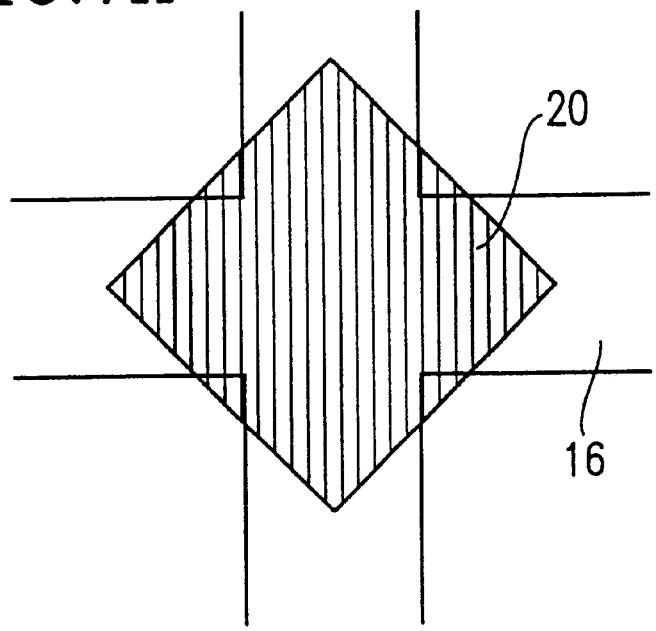
FIGS. 7A and 7B are schematic views of column-like projections formed greater than a size originally designed in the example according to the present invention and in a conventional example by comparison.
Figure 7B:
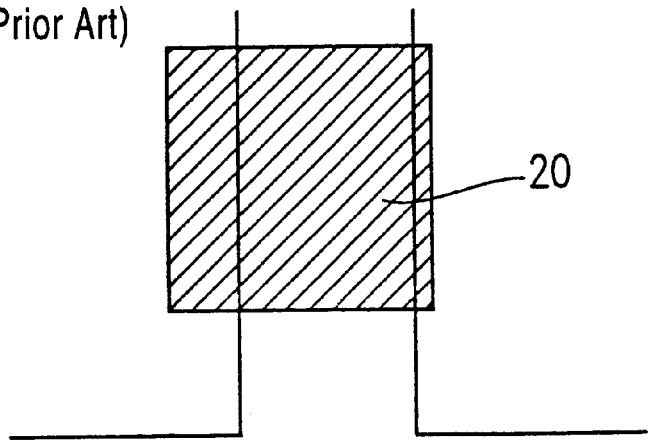

With reference to FIGS. 7A and 7B, the column-like projections 20 formed greater than a size originally designed in the example according to the present invention (FIG. 7A) and in the conventional example (FIG. 7B) will be compared.

In this case also, as in the case of FIGS. 6A and 6B, a portion of the column-like projection 20 in the example according to the present invention, which invades the liquid crystal region, has a surface approximately parallel to a tangential direction of a circle centered around the central axis of the axially symmetrical alignment, as shown in FIG. 7A. As a result, the axially symmetrical alignment of the liquid crystal molecules is hardly disturbed. By contrast, in the conventional example shown in FIG. 7B, a portion of each of the column-like projections 20 which invades the liquid crystal region has corners and thus disturb the axially symmetrical alignment of the liquid crystal molecules greatly. As a result, the viewing characteristic is deteriorated, and images being displayed become rough.

As described above, according to the present invention, even in the case where the column-like projections are produced to be greater than originally designed, the alignment of the liquid crystal molecules is not disturbed, and thus, a process margin for production can be increased.

Additionally, by forming the column-like projections directly above a black matrix of a color filter, a deterioration in the brightness of images displayed resulting from the existence of the column-like projections can be reduced.

Figure 8A:
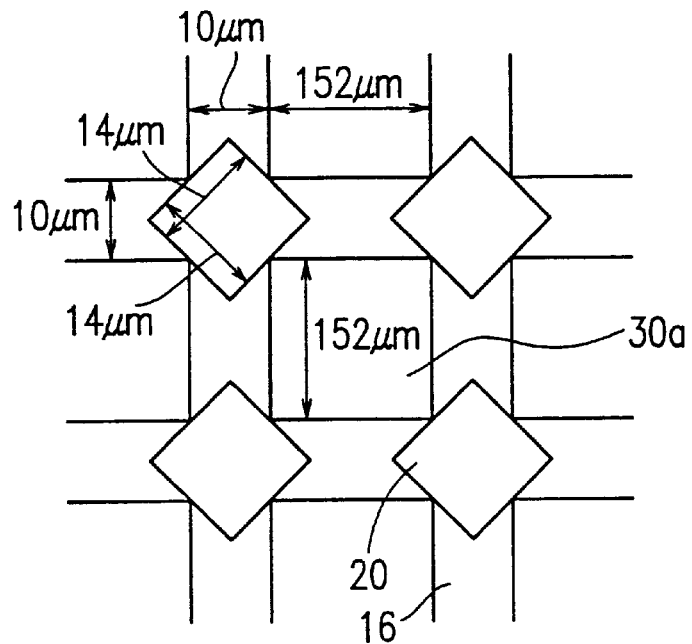
FIGS. 8A and 8B schematic views of column-like projections and a polymer wall of a liquid crystal display device according to example of the present invention and those of a comparative liquid crystal display device.
Figure 8B:
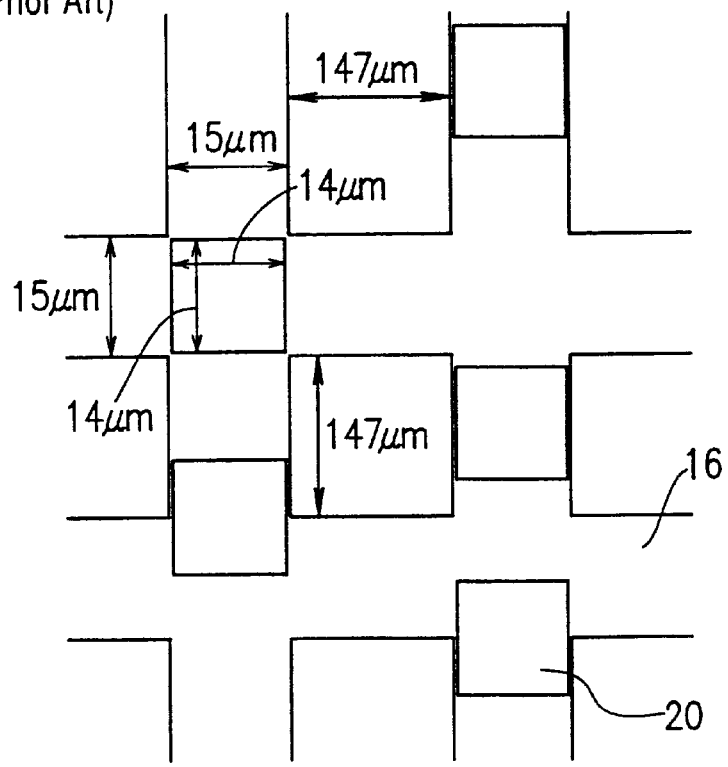
Figure 9A:
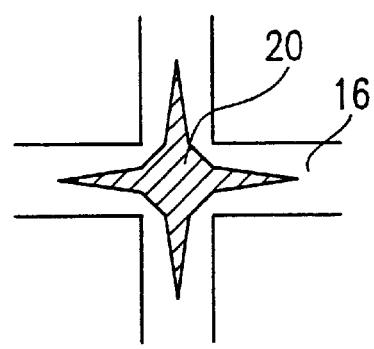
FIGS. 9A through 9G illustrate exemplary shapes of the column like projection usable according to the present invention, viewed in a direction normal to the first substrate.
Figure 9E:
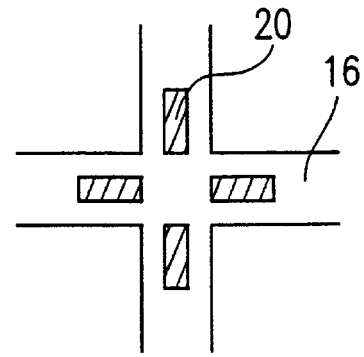
Figure 9B:
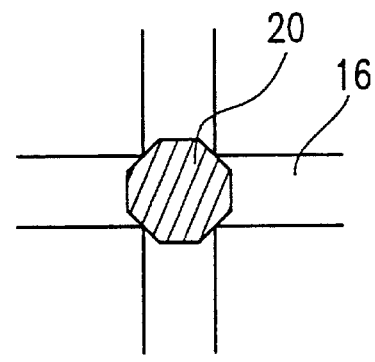
Figure 9F:
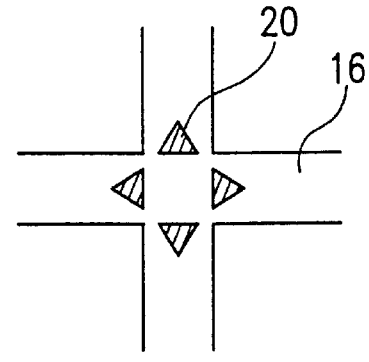
Figure 9C:
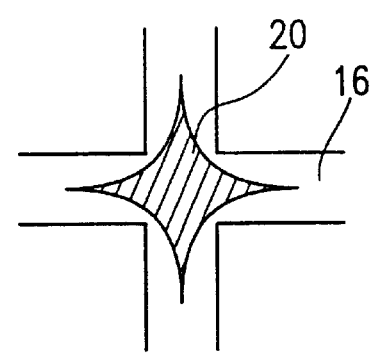
Figure 9G:
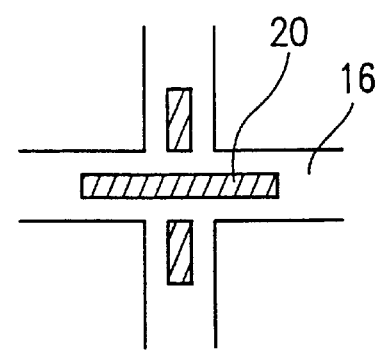
Figure 9D:
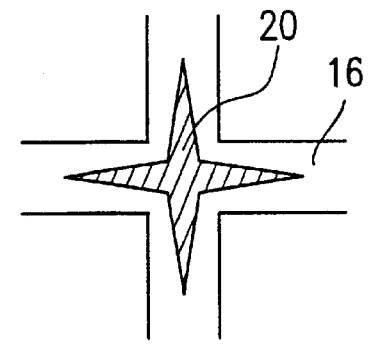
Figure 10A:
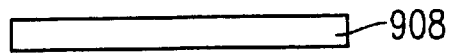
FIGS. 10A through 10I are schematic cross-sectional views illustrating steps of a method for producing a conventional liquid crystal display device.
Figure 10B:
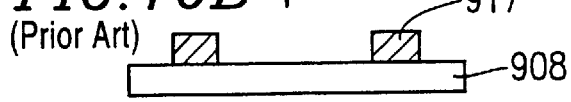
Figure 10C:
Figure 10E:
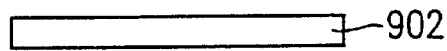
Figure 10D:
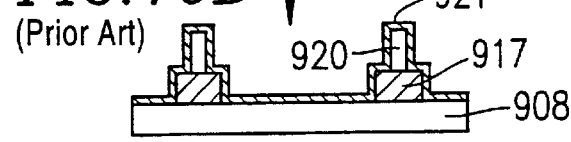
Figure 10F:
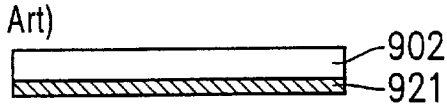
Figure 10G:
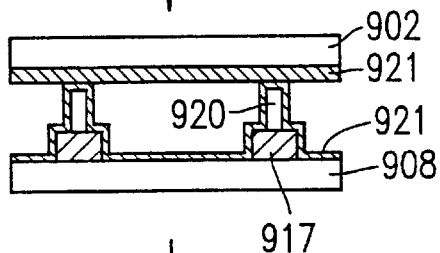
Figure 10H:
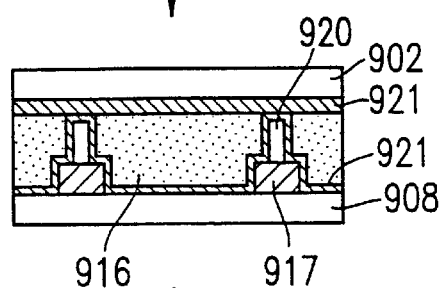
Figure 10I:
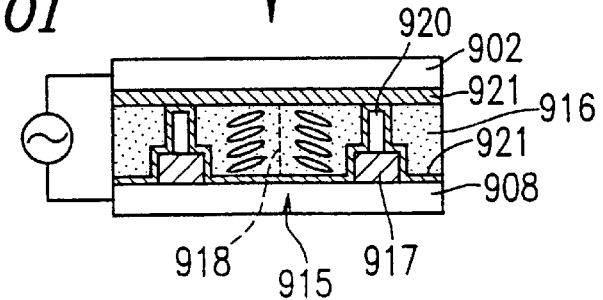
Figure 11:
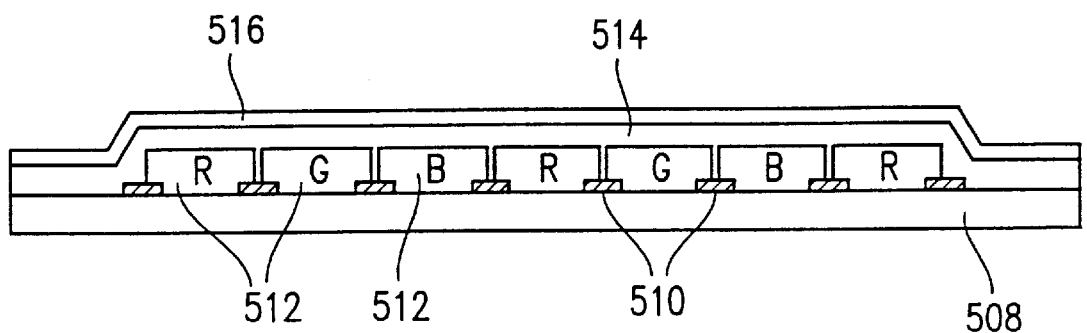
FIG. 11 is a schematic cross-sectional view of a color filter substrate.
Figure 12A:
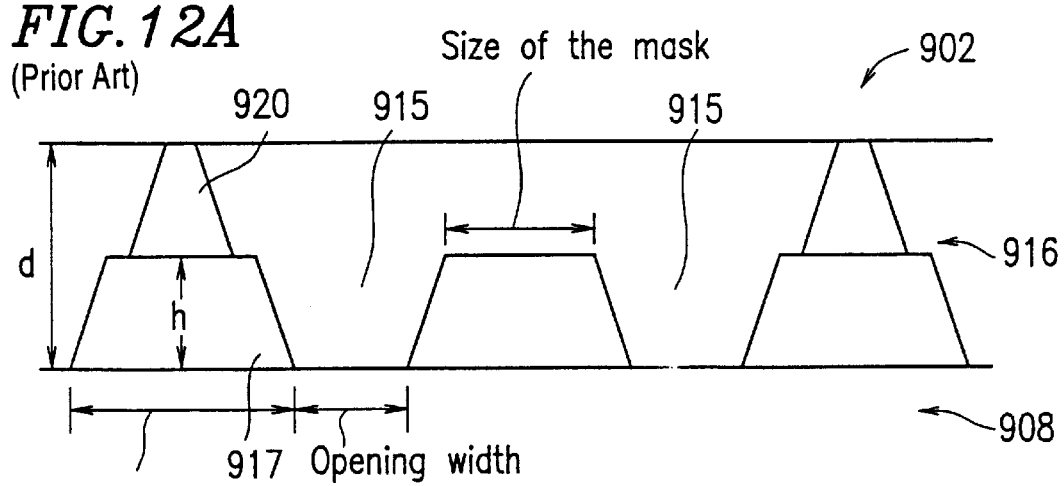
FIGS. 12A through 12D are schematic views illustrating problems associated with a conventional column-like projection.
Figure 12B:
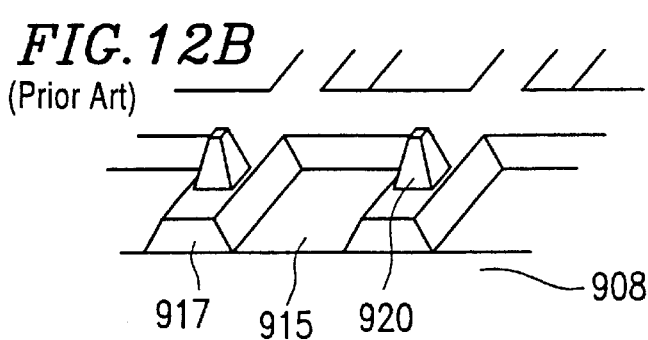
Figure 12C:
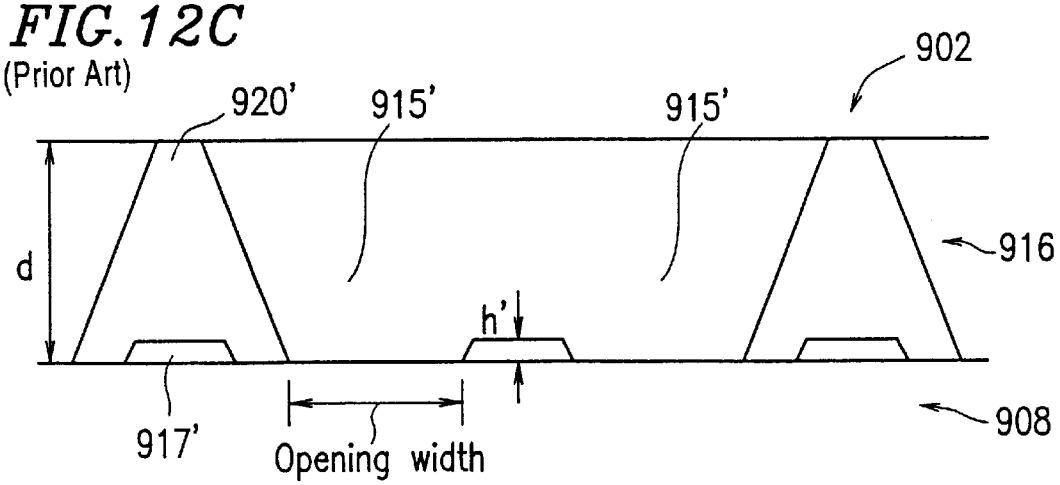
Figure 12D:
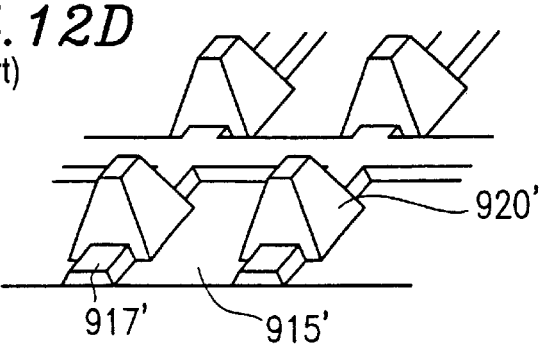

FIGS. 8A and 8B show respectively the column-like projections 20 and the polymer wall 16 of a liquid crystal display device according to an example of the present invention and those of a comparative liquid crystal display device.

As shown in FIG. 8A, in a liquid crystal display device according to an example of the present invention, a photosensitive acrylic resin layer having a thickness of about 5.5 $\mu$m is formed on a base plate by spin-coating. By subjecting the layer to a proximity exposure (proximity gap: about 100 $\mu$m), the column-like projections 20 are formed to have a height of about 5.5 $\mu$m. With a restriction on a size reduction of a photomask pattern, and the like, the resultant column-like projections 20 have a size of at least 14 $\mu$m×14 $\mu$m.

When a line width of the polymer wall 16 is designed so as to prevent the column-like projections 20 from extending beyond the polymer wall 16, the line width of the polymer wall 16 is about 10 $\mu$m.

By contrast, in the comparative liquid crystal display device, as shown in FIG. 8B, when the column-like projections 20 are formed under the same condition as described above, the line width of the polymer wall 16 is about 15 $\mu$m inclusive of an alignment margin in order to prevent the column-like projections 20 from extending beyond the polymer wall 16.

When a pixel pitch is fixed at 162 $\mu$m, an opening width of the liquid crystal display device of the present example is 152 $\mu$m×152 $\mu$m, while that of the comparative liquid crystal display device is 147 $\mu$m×147 $\mu$m. Thus, the numerical aperture of the liquid crystal display device according to the present invention is increased as compared to the conventional liquid crystal display device by 6.9% in terms of its designed size.

In the example according to the present inventions, the resin layer used for forming the column-like projections 20 is made of a transparent resin, so that a marking for positioning provided below the layer can be easily identified. Therefore, without requiring an additional step, the column-like projections can be accurately formed in predetermined positions.

In both of the cases shown in FIGS. 8A and 8B, the polymer wall 16 is formed by patterning a photosensitive acrylic resin layer having a thickness of 0.5 $\mu$m.

Liquid crystal display devices are produced in accordance with structures shown in FIGS. 8A and 8B to compare the display quality and the brightness of the devices. The liquid crystal display device of the present invention shows no rough display and has an excellent viewing angle characteristic. The brightness is 100 nit. On the other hand, the conventional liquid crystal display device exhibits a partially rough display, and an appearance of images displayed varies depending on a viewing direction in which observers view the display. The brightness is 85 nit.

An analysis performed by the present inventors found that the reason why the brightness of the conventional device is smaller than a value calculated from the design value is that the column-like projections are partially extended into the polymer wall. The liquid crystal region into which the column-like projections are extended exhibits a disturbance in the alignment of the liquid crystal molecules and images are significantly rough. Moreover, the viewing angle characteristic is also deteriorated.

The liquid crystal display device according to the present invention can be produced by applying a known production method, with a modification made for a shape of column-like projections, and a position and an arrangement thereof.

The shape of the column-like projections is not limited to the shape illustrated above. For example, various other shapes such as those shown in FIGS. 9A through 9G can also be employed. The same effect in the above-described examples can be obtained using these shapes.

As described above, the present invention provides a high resolution liquid crystal display device having a wide viewing angle characteristic and providing a bright image for the following reasons. Column-like projections can be formed to have a wider bottom surface, which allows the number of the column-like projections to be decreased. Furthermore, the height of the column-like projections can be increased and the height of the polymer wall can be reduced without disturbing the axially symmetrical alignment of the liquid crystal molecules. The decreased number and the decreased height of the column-like projections increase the injection speed of the liquid crystal material and thus reduces the time required for injecting the liquid crystal material.

Furthermore, a numerical aperture can be increased and thus, a brightness of a display can be improved. Moreover, a production yield can also be improved as a result of an increase in a process margin for a formation of the column-like projections.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:

a first substrate;

a second substrate; and a liquid crystal layer interposed between the first substrate and the second substrate, wherein:

the first substrate includes a polymer wall extending in a first direction and a second direction intersecting the first direction, the liquid crystal layer includes a plurality of liquid crystal regions separated by the polymer wall, liquid crystal molecules in the plurality of liquid crystal regions are axially symmetrically aligned with respect to an axis perpendicular to a substrate surface, the first substrate further includes a column-like projection, and the column-like projection and the polymer wall define a gap between the first substrate and the second substrate, the column-like projection is provided in at least an intersection region where a portion of the polymer wall extending in the first direction and a portion of the polymer wall extending in the second direction intersect each other, and wherein the column-like projection is provided on the polymer wall and has a side surface inclined with respect to the substrate surface, and the polymer wall has a height lower than that of the column-like projection.

2. A method for producing a liquid crystal display device including a first substrate having a base plate, a second substrate, and a liquid crystal layer interposed between the first substrate and the second substrate, the liquid crystal layer having a plurality of liquid crystal regions separated by a polymer wall, the method comprising:

forming a polymer layer supported by the base plate;

patterning the polymer layer, thereby forming the polymer wall extending in a first direction and in a second direction, the second direction intersecting the first direction;

forming a resin layer on the base plate to cover the polymer wall; and patterning the resin layer, thereby forming a column-like projection in at least an intersection region where a portion of the polymer wall extending in the first direction and a portion of the polymer wall extending in the second direction intersect each other;

wherein the resin layer is formed of a photosensitive resin, and the step of forming the column-like projection includes the step of patterning the resin layer by photolithography; and wherein the step of patterning the resin layer includes the step of exposing the resin layer through a mask having a quadrangular opening, wherein the resin layer is exposed to light generated by a first, second, third and fourth light sources arranged in such a way that images thereof are located on diagonal lines and in the vicinity of corners of the quadrangular opening, thereby forming the column-like projection having a cross section shaped to correspond to the quadrangular opening.

* * * * *